3,230,277
CIS-POLYBUTADIENE MODIFIED COPOLYMERS OF ALPHA-METHYLSTYRENE AND METHYL METHACRYLATE
Charles H. Schramm, Easton, Pa., assignor to J. T. Baker Chemical Company, Phillipsburg, N.J., a corporation of New Jersey
No Drawing. Filed June 14, 1960, Ser. No. 35,890
5 Claims. (Cl. 260—880)

This invention relates to new graft interpolymers of methyl methacrylate, alpha-methylstyrene, and polybutadiene elastomers in which the double bonds are in a cis configuration. These new products have superior properties to previously known polymers of methyl methacrylate or alpha-methylstyrene and copolymers of these polymerizable materials. Methods of preparing these novel graft interpolymers are also included within the scope of the invention.

Polymers of methyl methacrylate are of limited hardness and are of low heat and mar resistance. Cross linking leads to increased brittleness and yields products which are difficult or impossible to mold. Solid polymers of alpha-methylstyrene are brittle and cannot be molded. Copolymers of methyl methacrylate and alpha-methylstyrene which have been described in the literature are of low molecular weight and have poor strength, toughness and heat and mar resistance.

The new polymers of the present invention are superior in that they have a high impact strength which is maintained over a long period of time and show more resistance to breakage from blows and other shocks than known copolymers of methyl methacrylate and alpha-methylstyrene. In addition, the resilience of the new graft interpolymers is improved so that considerable flexural deformations can be applied without fracture occurring. The new graft interpolymers of the present invention have higher heat distortion values than commercially available graft interpolymers of methyl methacrylate and butadiene.

The new polymers are also superior in heat resistant characteristics to similar polymers made with methyl methacrylate, alpha-methylstyrene and polybutadiene elastomers having a random or atactic arrangement of the double bonds. These new products are completely resistant to boiling water, whereas those prepared with normal polybutadiene become cloudy and opaque after continued submersion in boiling water. In addition the new polymers have superior resistance to alkalis and are particularly useful because of their resistance to strong alkaline detergents at high temperatures.

The new polymers of the present invention are essentially transparent, have better clarity, improved color characteristics and better optical properties than those polymers made with normal polybutadiene. Improvements in these and other important properties extend the uses to which graft interpolymers of this class can be put.

In order that the invention may be better understood, a preferred and specific embodiment thereof will be described in the following example.

*Example I*

Seventy-five parts by weight of methyl methacrylate, 25 parts by weight of alpha-methylstyrene, 0.2 part by weight of benzoyl peroxide and 0.2 part by weight of tertiary dodecyl mercaptan were mixed and 10 parts by weight of a cis-polybutadiene rubber distributed under the name "CIS-4" was dispersed in the mixture. The polybutadiene was a product in which approximately 94 percent of the unsaturated bonds were in the cis configuration. The material was then charged into a clean glass bottle, and the vapor space above the liquid was flushed with nitrogen and the bottle sealed. Polymerization was allowed to take place for three days at 90° C., and then for three more days at 110° C. The unpolymerized monomers were removed from the graft interpolymer by extruding the composition through a small orifice at about 460° F. and applying vacuum to a vent in the extruder.

When the graft interpolymer was ground and compression molded into ½ x ½ x 5 inch bars, it had the following physical properties:

ASTM heat distortion, D648–56 _____ ° C__ 115.5
Notched Izod impact strength, D – 256 – 56
                      foot pounds per inch__ 1.20

A compression molded sheet, about 1/16 inch thick, had a light transmission of 80–82 percent at a wave length of 550 millimicrons (5500 Angstroms), the region of maximum visibility of the human eye. In appearance, the molded sheet was essentially transparent, with a slight yellow-brown color. It was possible to drive a nail into this sheet without any splitting of the material, so that the nail was firmly held in place. In addition, cylindrical shaped strands of the graft interpolymer could be cut or machined very readily into pointed nails which could be driven through thick sections of wood without damage to the graft interpolymer nail.

The injection moldability of the material was easily demonstrated using a 1-ounce injection molding machine set at 470° F. and at 14,700 pounds per square inch pressure to produce ½ x ¼ x 5 inch test specimens.

When tested for notched Izod impact strength, the bars gave a value of 1.2 foot pounds per inch. Flexural strength measurements using ASTM Method D–790–49T gave a value of 11,300±200 pounds per square inch.

Other compression molded test specimens gave the following results:

Specific gravity _____ 1.135
Rockwell hardness, ASTM Method D–785–51 _____ M 78–M 80

Variations in the composition of the graft interpolymer may, of course, be made as well as variations in the polymerization procedure. The polymerization is preferably caused to take place in the range of 90° C. to about 115° C. with higher temperatures being used at the end of the polymerization. Higher temperatures speed up the polymerization; but because of the relatively low boiling points of the monomers, the temperature should not be so high as to result in volatilization of the essential components. Temperatures lower than 90° C. may also be used, but the polymerization period becomes excessively long for economic manufacture.

The benzoyl peroxide which is used as a polymerization catalyst can be replaced by other peroxides which are known to catalyze the polymerization of methyl methacrylate or alpha-methylstyrene. Among these are tertiary butyl hydroperoxide and di-tertiary butyl peroxide.

Still other catalysts such as the persulfates, ozonides, diazotates, hydrazines, diazonium salts, amine oxides and others may be used as polymerization catalysts. In fact, the polymerization can be carried out without the aid of a catalytic agent, if desired. Amounts of the catalyst from 0.01 percent to 0.8 percent by weight are usually employed.

Various aliphatic mercaptans may be used in place of tertiary dodecyl mercaptan as stabilizers or regulators of the polymerization. Similarly, a number of organic disulfides of the formula R—S—S—R' in which R and R' are alkyl radicals of one to sixteen carbon atoms or aryl radicals such as phenyl, tolyl, parachlorophenyl, naphthyl and aralkyl radicals such as benzyl may also be used to give superior interpolymers. These polymerization regulators and polymer stabilizers may be used in amounts of from 0.01 to about 2 parts by weight of the polymerization mixture. In addition to regulating the polymerization, these mercaptans and disulfides appear to increase the resistance of the graft interpolymer to thermal degradation.

The preferred elastomer for use in practicing the present invention is a cis-polybutadiene rubber in which most of the double bonds are in the cis configuration. It is preferred that the polybutadiene have essentially all of the double bonds in this relationship, but observable improvements in the polymer are obtained when the polybutadiene has 75 percent or more of the double bonds in the cis configuration.

To illustrates the effect of the cis-polybutadiene rubber on the graft interpolymer, a series of the products were made in which the proportion of the cis-polybutadiene was varied. In each of these products, the proportion of alpha-methylstyrene to methyl methacrylate was maintained at 25 parts of the former to 75 parts of the latter as in Example I. All of the other conditions of the polymerization described in Example I were observed. The following results were obtained:

| Cis-polybutadiene Rubber, Percent | ASTM Heat Distortion, °C. | Notched Izod Impact Strength, ft. lbs./in. |
|---|---|---|
| 0 | 122.5 | 0.23 |
| 2 | 122 | 0.22 |
| 4 | 118 | 0.52 |
| 6 | 118 | 0.71 |
| 8 | ¹ 118 | ¹ 1.01 |
| 10 | ¹ 118.5 | ¹ 1.14 |
| 15 | ¹ 117 | ¹ 1.24 |
| 20 | ¹ 115 | ¹ 1.28 |

¹ Graft interpolymers were devolatized twice.

These new polymers did not whiten upon exposure to boiling water. The ASTM heat distortion values are uniformly higher than in the case of products made with the normal polybutadiene rubbers and the notched Izod impact strength was generally higher. The products also have better optical properties than those produced with the normal polybutadiene rubber.

Any of the known methods of polymerizing substances such as methyl methacrylate and alpha-methylstyrene may be used such as bulk polymerization as described in the above examples, solution polymerization in which the polymerization is carried out with the monomers dissolved in a solvent or emulsion or suspension polymerization in which the monomers are emulsified and suspended in an inert liquid. Various wetting and emulsifying agents may be added in such cases to perform their known function.

The impact strength of the graft interpolymers described hereinabove may run from two to six times the values of copolymers of methyl methacrylate and alpha-methylstyrene which have not been modified by the addition of an elastomer. This increase means that articles molded from the new graft interpolymers are much more resistant to breakage from blows and other sudden shocks. In addition, the resilience of the graft interpolymers was much improved so that considerable flexural deformation without fracture occurred. Another advantage is the fact that the graft interpolymers can be nailed which is a valuable feature for fabrication operations.

The new graft interpolymers of the present invention are also found to have a heat distortion point of 15–25 degrees higher than those found for other commercially available graft interpolymers of butadiene and methyl methacrylate, for instance.

The new polymers of the present invention have a relatively high light transmission which is an unexpected and important property of the new products.

These and other properties make these new graft interpolymers useful where a tough plastic is required such as shoe heels, machine parts, jigs and fixtures, separators, plastic pipe, machine housings, sight glasses and many other industrial applications.

As will be understood by those skilled in the art, small amounts of colors, fillers, plasticizers, and even reactants such as acrylonitrile and styrene may be added to the polymerization mixture to obtain special effects without, however, changing the essential character of the invention as described above.

I claim:

1. A composition of matter comprising a graft interpolymer of methyl methacrylate, alpha-methylstyrene and an elastomer, said graft interpolymer being the polymerization product of 10 to 55 parts by weight of alpha-methylstyrene, 90 to 45 parts by weight of methyl methacrylate and 1 to 20 parts by weight of a cis-polybutadiene elastomer in which at least 75 percent of the double bonds are in the cis configuration.

2. A composition of matter comprising a graft interpolymer of methyl methacrylate, alpha-methylstyrene and a butadiene-based elastomer, said graft interpolymer being the polymerization product of 85 to 65 parts by weight of methyl methacrylate, 15 to 35 parts by weight of alpha-methylstyrene, and 5 to 15 parts by weight of a cis-polybutadiene elastomer in which at least 75 percent of the double bonds are in the cis configuration.

3. A composition of matter comprising a graft interpolymer of methyl methacrylate, alpha-methylstyrene and a butadiene-based elastomer, said graft interpolymer being the polymerization product of about 75 parts by weight of methyl methacrylate, about 25 parts by weight of alpha-methyl styrene, and about 10 parts by weight of a cis-polybutadiene elastomer in which at least 75 percent of the double bonds are in the cis configuration.

4. A process of preparing graft interpolymers of methyl methacrylate, alpha-methylstyrene and elastomers which comprises mixing together 10 to 55 parts by weight of alpha-methylstyrene, 90 to 45 parts by weight of methyl-methacrylate, 1 to 20 parts by weight of a cis-polybutadiene elastomer in which at least 75 percent of the double bonds are in the cis configuration, and 0.01 to 0.8 parts by weight of a polymerization catalyst and from about 0.01 to 2 parts by weight of a polymerization regulator of the group consisting of aliphatic mercaptans and organic disulfides of the formula R—S—S—R' in which R and R' are alkyl radicals of one to sixteen carbon atoms, and heating the mixture until polymerization is substantially complete.

5. A process in accordance with claim 4 in which the polymerization catalyst is benzoyl peroxide and the polymerization regulator is tertiary dodecyl mercaptan.

References Cited by the Examiner

UNITED STATES PATENTS

| | | | |
|---|---|---|---|
| 2,762,790 | 11/1956 | Greene | 260—880 |
| 2,802,808 | 8/1957 | Hayes | 260—880 |
| 2,979,488 | 4/1961 | Carpenter | 260—79 |
| 2,989,420 | 6/1961 | Zdanowski | 260—880 |
| 3,029,222 | 4/1962 | Briskin | 260—880 |

(Other references on following page)

FOREIGN PATENTS 564,366    2/1958    Belgium.
1,205,234    8/1959    France.

OTHER REFERENCES

Kraus et al.: The Rubber and Plastics Age, October 1957, pages 880–893.

Morton: "Introduction to Rubber Technology," page 56, published by Reinhold, New York, 1959.

Gaylord et al.: "Linear and Stereospecific Addition Polymers," pages 66–67, published by Interscience, New York.

Clark et al.: "The Encyclopedia of Chemistry" (supplement), pages 286–289, published by Reinhold, New York.

MURRAY TILLMAN, *Primary Examiner.*

D. ARNOLD, L. J. BERCOVITZ, *Examiners.*